US009001836B2

(12) United States Patent
Jaiswal et al.

(10) Patent No.: US 9,001,836 B2
(45) Date of Patent: Apr. 7, 2015

(54) METHOD AND APPARATUS FOR EFFICIENT SIGNALING MESSAGE PROCESSING IN A COMMUNICATIONS NETWORK

(75) Inventors: Suraj Jaiswal, Santa Clara, CA (US); Renhua Wen, San Ramon, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 296 days.

(21) Appl. No.: 13/473,543

(22) Filed: May 16, 2012

(65) Prior Publication Data

US 2013/0308526 A1 Nov. 21, 2013

(51) Int. Cl.
*H04W 8/00* (2009.01)
*H04W 88/16* (2009.01)
*H04W 8/08* (2009.01)
*H04W 76/02* (2009.01)

(52) U.S. Cl.
CPC .............. *H04W 88/16* (2013.01); *H04W 8/085* (2013.01); *H04W 76/021* (2013.01)

(58) Field of Classification Search
None
See application file for complete search history.

(56) References Cited

U.S. PATENT DOCUMENTS

| | | | | |
|---|---|---|---|---|
| 2009/0052398 | A1* | 2/2009 | Hofmann ....................... | 370/331 |
| 2010/0232407 | A1* | 9/2010 | Navali et al. .................. | 370/338 |
| 2011/0075557 | A1* | 3/2011 | Chowdhury et al. ......... | 370/230 |

OTHER PUBLICATIONS

"3GPP TS 23.401, 3rd Generation Partnership Project; Technical Specification Group Services and System Aspects; General Packet Radio Service (GPRS) enhancements for Evolved Universal Terrestrial Radio Access Network (E-UTRAN) access (Release 11)", Mar. 2012, 284 pages, V11.1.0, 3GPP Organizational Partners, downloaded http://www.3gpp.org/ftp/Specs/html-info/23401.htm on Apr. 11, 2012.
"3GPP TS 23.402, 3rd Generation Partnership Project; Technical Specification Group Services and System Aspects; Architecture enhancements for non-3GPP accesses (Release 11)", Mar. 2012, 251 pages, V11.2.0, 3GPP Organizational Partners, downloaded from http://www.3gpp.org/ftp/Specs/html-info/23402.htm on Apr. 11, 2012.
S. Gundavelli et al., "Proxy Mobile IPv6", Aug. 2008, 92 pages, Network Working Group, Request for Comments: 5213, The IETF Trust, downloaded from http://tools.ietf.org/pdf/rfc5213.pdf on Apr. 10, 2012.
B. Aboba et al., "The Network Access Identifier", Dec. 2005, 16 pages, Network Working Group, Request for Comments: 4282, The Internet Society, downloaded from http://tools.ietf.org/pdf/rfc4282.pdf on May 16, 2012.

* cited by examiner

*Primary Examiner* — Donald Mills
(74) *Attorney, Agent, or Firm* — Blakely Sokoloff Taylor & Zafman, LLP

(57) ABSTRACT

A network element that acts as a local mobility anchor (LMA) in a communications network efficiently distributes signaling messages using a data plane and a control plane having a plurality of processes executing on a plurality of processing units. When a network connection ID of a received signaling message is not mapped to a host process in a steering table, the signaling message is sent to a process in the control plane. A second process is assigned to be the host process for the network connection, and the steering table is updated to indicate this assignment. Upon receipt of a second signaling message with the network connection ID, it is efficiently sent to the second process because of the updated steering table. A mobility access gateway (MAG) also utilizes a steering table with network connection ID to host process mappings to efficiently distribute signaling messages.

20 Claims, 6 Drawing Sheets

METHOD AND APPARATUS FOR EFFICIENT SIGNALING MESSAGE PROCESSING IN A COMMUNICATIONS NETWORK

FIELD

Embodiments of the invention relate to the field of computer networking; and more specifically, to efficient signaling message processing in a communications network.

BACKGROUND

Fourth Generation Long Term Evolution (4G LTE), proposed by the 3rd Generation Partnership Project (3GPP) standardization body, is the evolution path for existing networks such as GSM and UMTS. 4G LTE is a complete network redesign from the access network to the core network, which provides mobile broadband to mobile users. The 4G LTE access network, named the Evolved UMTS Terrestrial Radio Access Network (E-UTRAN), utilizes multi-antenna and multiuser coding techniques to achieve unprecedented transmission speeds of 100s of Mbps on the downlink and 10s of Mbps on the uplink. The 4G LTE network core, named the Evolved Packet Core (EPC), is a flat all-IP based architecture.

The EPC core includes a Mobility Management Entity (MME), which is analogous to a Serving GPRS Support Node (SGSN) control plane from a GSM core network. The EPC core also includes a Serving Gateway (SGW), which is analogous to a SGSN data plane, and a Packet Data Network Gateway (PDN-GW, or PGW), which is analogous to a Gateway GPRS Support Node (GGSN) from a GSM network.

PGW functionality is described in 3GPP TS 23.401 for 3GPP accesses connected to the EPC via a General Packet Radio Service (GPRS) Tunneling Protocol (GTP) or Proxy Mobile IPv6 (PMIPv6, or PMIP) S5/S8 interface. The PGW also supports functionality that is common to both PMIP-based and GTP-based S5/S8 interfaces for access to the EPC via non-3GPP accesses as described in 3GPP TS 23.402.

Additionally, the PGW serves as a user plane anchor for mobility between 3GPP accesses and non-3GPP accesses to the EPC. To act as the user plane anchor, the PGW may provide Local Mobility Anchor (LMA) functionality according to the PMIPv6 specification outlined in the Internet Engineering Task Force (IETF) Request for Comments (RFC) 5213. Because the PGW serves as the LMA anchor point for user equipment (UE) PDN connections on the S5, S8, S2a, and S2b interfaces, the PGW sends and receives control plane messages in the form of Proxy Binding Update (PBU) messages and Proxy Binding Acknowledgement (PBA) messages to and from the MAGs.

Mobile nodes utilize the LMA functionality via access gateways that provide Mobile Access Gateway (MAG) functionalities according to the PMIPv6 specification. A MAG is a function on an access router that manages mobility-related signaling for a mobile node that is attached to its access link. One such access gateway operable to function as a MAG in LTE networks is the SGW, which is utilized when the mobile node is using traditional 3GPP access. However, alternative access gateways may serve as a MAG for the mobile node, such as a Wi-Fi access gateway (WAG), an Enhanced Packet Data Gateway (ePDG), a Home eNodeB Gateway (HeNB-GW), or a High-Rate Packet Data (HRPD) Serving Gateway (HSGW) in Code Division Multiple Access 2000 (CDMA2000) HRPD access networks.

PBU messages are transmitted by MAGs to LMAs in many circumstances, such as during initial UE attachment to the E-UTRAN, IPv4 address allocation by a DHCP server collocated with the PGW, UE detachment from the E-UTRAN, UE-requested additional PDN connectivity, a UE/MME/SGW-initiated PDN disconnection procedure, Intra-LTE and Inter-eNodeB handovers with SGW relocation, Inter-Radio Access Technologies (RAT) Tracking Area Update (TAU) or Radio Area Update (RAU) or Handover with SGW relocation, initial UE attachment on the S2a interface, initial attachment for chained PMIPv6-based 58-S2a/b roaming scenarios, and many other situations.

With mobile network traffic growing exponentially, service providers must be careful to manage their networks to ensure their ability to provide continued service. However, in addition to increased IP forwarding requirements, the increase of traffic has also led to a significant growth in control plane signaling load being placed on these networks. While adding additional LMA and MAG resources may help these networks scale to meet these demands, additional signaling load complexity and inefficiencies are introduced as a result.

SUMMARY

According to one embodiment of the invention, a method is performed in a data plane of a network element acting as a local mobility anchor (LMA) in a communications network for the efficient distribution of signaling messages. The data plane is configured to receive signaling messages from a set of one or more mobility access gateways (MAGs). Each signaling message includes a network connection identifier (ID) associated with an end station device. The network element further includes a control plane having a plurality of processes executing on a plurality of processing units. The method includes the step of receiving a first signaling message from a MAG of the set of MAGs. Responsive to receiving the first signaling message, the data plane determines, according to a steering table, that a first network connection ID of the first signaling message is not mapped to a process. The data plane also selects a first process of the plurality of processes to receive the first signaling message. This selected first process executes on a first processing unit of the control plane. The method further includes the step of transmitting the first signaling message to the selected first process. The method further includes receiving a mapping message from the control plane. This mapping message indicates a mapping of the first network connection ID to a second process, which executes on a second processing unit of the control plane. The method further includes updating the steering table to indicate the mapping of the first network connection ID to the second process, and receiving a second signaling message from the MAG. The second signaling message includes the first network connection ID. Responsive to receiving the second signaling message, the data plane determines, according to the steering table, that the first network connection ID is mapped to the second process. The data plane also transmits the second signaling message to the second process.

In another embodiment of the invention, a network element serves as a local mobility anchor (LMA) and efficiently distributes signaling messages. The network element is to be coupled between a set of one or more mobility access gateways (MAGs) and a data network. The network element comprises a set of one or more line cards configured to communicate with the set of MAGs and a set of one or more control cards configured to execute a plurality of processes on a plurality of processing units. The set of line cards are configured to receive signaling messages from the set of MAGs. Each received signaling message is to include a network connection identifier (ID) associated with an end user device.

The set of line cards are also configured to transmit the signaling messages to the plurality of processes. These processes are to be selected to receive the signaling messages according to a steering table, which maps network connection IDs of signaling messages to processes of the plurality of processes. The set of line cards are also configured to receive mapping messages from some of the plurality of processes. Each of the mapping messages are to indicate a mapping of a network connection ID of a signaling message to a process. The set of line cards are also configured to update the steering table to indicate the mappings of network connection IDs to processes according to the received mapping messages. The network element also comprises the set of one or more control cards configured to execute the plurality of processes. Each of the plurality of processes is configured to receive signaling messages from at least one of the set of line cards. Each of the plurality of processes are also configured to transmit the received signaling messages to different processes of the plurality of processes when the different processes are configured to process the signaling messages, and also to transmit mapping messages to at least one of the set of line cards to indicate mappings between network connection IDs of the received signaling messages and that process when that process first establishes a session for the network connection IDs.

According to another embodiment of the invention, a method is performed in a network element acting as a mobility access gateway (MAG) in a communications network to efficiently distribute signaling messages. The network element has a data plane configured to transmit and receive signaling messages to and from a local mobility anchor (LMA). Each signaling message includes a network connection identifier (ID) associated with an end station device. The network element also includes a control plane having a plurality of processes executing on a plurality of processing units. The method includes creating a user equipment (UE) session for an end station device, which is used to provide the end station device network connectivity through the LMA. The UE session is assigned to a host process of the plurality of process and associated with a network connection ID. The method also includes updating a steering table to indicate a mapping between the network connection ID and the host process, and transmitting a Proxy Binding Update (PBU) message to the LMA. This PBU message includes the network connection ID. The method further includes receiving a Proxy Binding Acknowledgement (PBA) message from the LMA. This PBA message includes the network connection ID. Responsive to receiving the PBA message from the LMA, the network element determines, according to the steering table, that the network connection ID from the PBA message is mapped to the host process. The network element also forwards the PBA message to the host process.

In another embodiment of the invention, a network element serves as a mobility access gateway (MAG) and efficiently distributes signaling messages. The network element is to be coupled between a local mobility anchor (LMA) and an end station device. The network element includes a set of one or more line cards configured to communicate with the LMA, the end station device, and a set of one or more control cards configured to execute a plurality of processes on a plurality of processing units. The set of line cards are configured to create user equipment (UE) sessions for end station devices. Each UE session is to be assigned to a host process of the plurality of processes and associated with a network connection identifier (ID). The UE sessions are used to provide the end station devices network connectivity through the LMA. The set of line cards are also configured to update a steering table to indicate a mapping between network connection IDs and host processes, and transmit Proxy Binding Update (PBU) messages to the LMA. Each of the PBU messages includes a network connection ID. The set of line cards are also configured to receive Proxy Binding Acknowledgement (PBA) messages from the LMA, where the PBA messages each include a network connection ID. Responsive to receipt of a PBA message from the LMA, the set of line cards are configured to determine, according to the steering table, that the network connection ID included in that PBA message is mapped to a host process, and forward that PBA message to that host process. The network element also includes the set of one or more control cards configured to execute the plurality of processes. Each of the plurality of processes is configured to receive PBA messages from at least one of the set of line cards.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
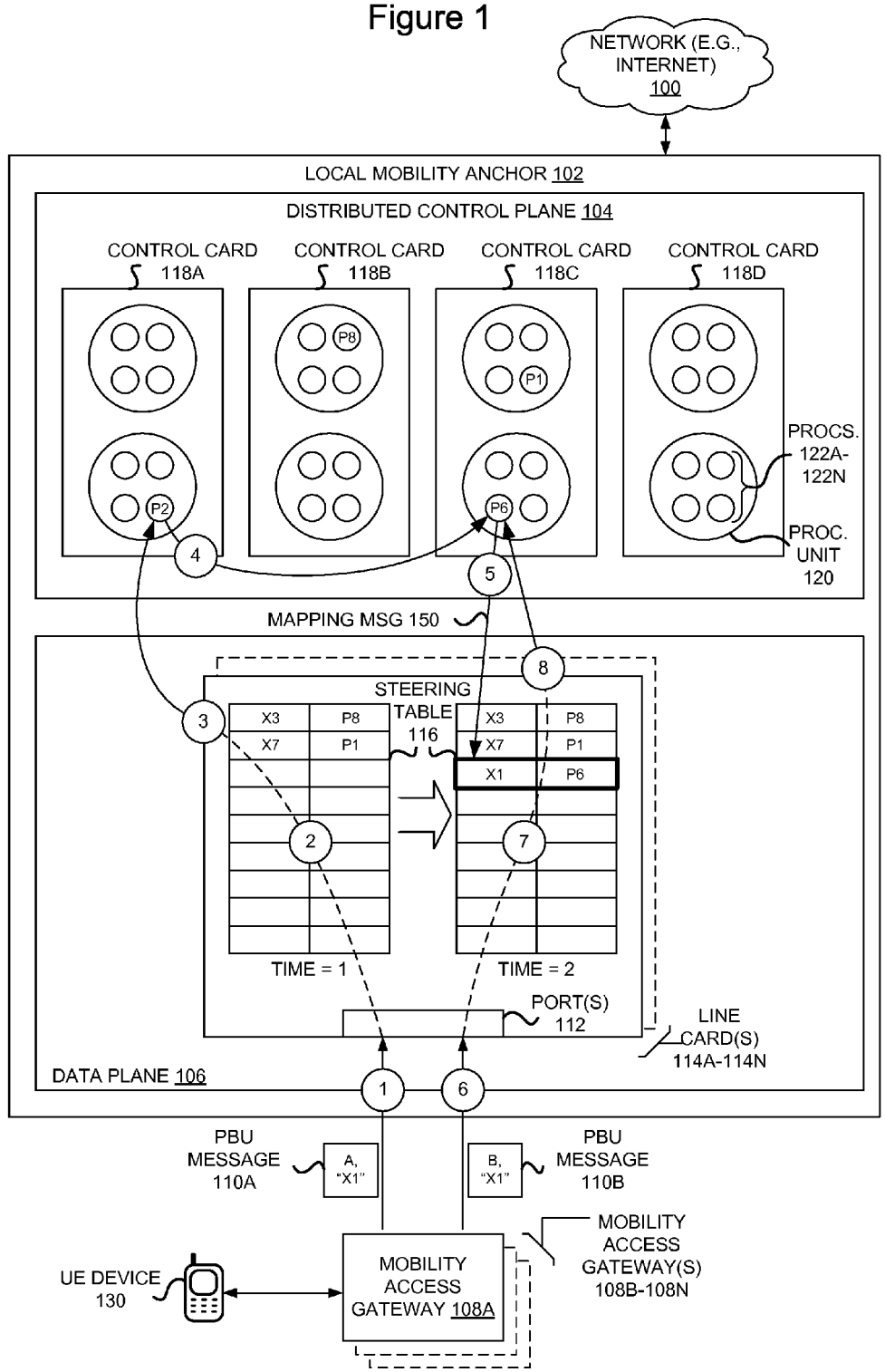
FIG. 1 illustrates a communications network including a Local Mobility Anchor according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

To meet the ever-increasing demand for mobile network connectivity, next-generation networks such as EPC may utilize architectures including distributed control planes and multicore packet processing in the data plane. Consequentially, the development of efficient packet processing software for distributed multicore processing is a key challenge for such EPC platforms.

One approach to implementing distributed multicore packet processing includes distributing UE PDN connection processing across a plurality of processes in the distributed control plane. Each of these processes may be bound to Central Processing Units (CPUs) or CPU cores and may have static or dynamic affinity to these processing units. Thus, the distribution of UE PDN connection processing may be to multiple CPU cores, multiple CPUs, or even multiple control plane cards to enable control plane scalability and high availability. However, this distribution creates a challenge in identifying, mapping, and forwarding received control plane signaling messages (each associated with a UE PDN connection) to the particular process managing that UE PDN connection.

An approach for distributing control plane signaling messages to the correct managing process applies traditional control packet techniques on the data plane cards. For example, all received control plane messages may be forwarded to a message handling process in the control plane, which must then decide what process manages (or hosts) that particular control plane message. The handling process must then forward the control plane message to the proper host process, which may be on the same CPU core, a different CPU core, or on a different control plane card altogether. This introduces a significant additional control plane burden, as additional intra-control plane messaging is required to forward the control plan message to the host process.

Another approach to forwarding received control plane messages from the data plane to the control plane applies a round robin distribution or random selection distribution, which eliminates the need for a dedicated message handling process. In these configurations, a received control plane message is sent to an arbitrary process executing on the control plane. While it is possible that this arbitrary process is in fact the host process for the received control plane message, it is much more likely that the arbitrary process is not the host process. Further, as distributed control planes continue to scale (perhaps by the addition of more control cards executing additional control plane processes), it will become more and more likely that the arbitrarily-selected process will not be the host process of the received control plane message. Thus, when the arbitrary process is not the host process for the message, the arbitrary process needs to determine which process in the control plane is the host process and then send the received control plane message to the host process. This steering is expensive, as it has occupied some execution time of the arbitrary process in order to determine the proper host process, thereby reducing the available execution time the arbitrary process has for other tasks. Additionally, this steering required additional intra-control plane signaling to move the received control plane message to the proper host process. For example, the intra-control plane signaling may require signaling between control plane cards across the chassis backplane, which is a very expensive and often congested communication channel. Further, steering the received control plane messages from the arbitrary process to the host process requires increased memory consumption as well as CPU cycles lost due to the need for waiting for additional memory reads and writes to complete. Thus, reducing or eliminating the extra burden caused by sending received control plane messages to arbitrary processes, which in turn must then send the message to the host process, would create a significant benefit in allowing efficient scalability and robustness in distributed multicore packet processing configurations.

According to one aspect of the invention, this extra inefficiency is significantly eliminated by reducing the need to transmit received control plane messages through an arbitrary control plane process to get to the host process. An embodiment of the invention utilizes a steering table (or steering data structure) to assist the data plane in steering received control plane messages directly to their respective host processes. The steering table may be keyed using a mobile node network access identifier (MN-NAI) contained within control messages.

FIG. 1 illustrates a communications network including a Local Mobility Anchor 102 (LMA) according to one embodiment of the invention. In this embodiment, a user equipment (UE) device 130 (i.e. subscriber end station) is coupled to one or more of the mobility access gateways 108A-108N (MAGs) to gain access to a data network 100 coupled to the LMA 102. This data network 100 may be the Internet or another data network provided by a service provider. In this embodiment the communications network utilizes the PMIPv6 network-based mobility management protocol; however, the invention is also useful in other networks.

In this embodiment, the LMA includes a data plane 106 and a distributed control plane 104. The distributed control plane includes four control cards (118A, 118B, 118C, and 118D). Each of these control cards includes two processing units (e.g. 120), which may represent a CPU or a CPU core. Each processing unit is illustrated with multiple processes (e.g. 122A-122N). The quantities and configuration of the distributed control plane 104 are merely illustrative; more or fewer control cards 118A-118D may be used, more or fewer processing units (e.g. 120) may be included per control card, and more or fewer processes (e.g. 122A-122N) may execute. Additionally, while FIG. 1 indicates that the processes (e.g. 122A-122N) appear to be contained on one processing unit (e.g. 120), these processes may not be bound or have affinity to a particular processing unit or control card.

When the UE device 130 initially attaches to a MAG 108A, the MAG 108A will identify the UE device 130 and work to create a session allowing network 100 connectivity for the UE device 130. In performing these tasks, the MAG 108A will send and receive control messages to and from the LMA 102. In this embodiment, because the network is a PMIPv6 network, the control messages comprise Proxy Binding Update (PBU) messages and Proxy Binding Acknowledgement (PBA) messages.

When initially connecting to the network, the UE device 130 may transmit a Router Solicitation message to the MAG 108A. Before or after this event, the MAG 108A will transmit a PBU message 110A to the LMA 102. This PBU message 110A may be for the purpose of initializing a connection to the network 100 for the UE device 110A, informing the LMA 102 about the current location of the UE device 110A, or for setting up a bi-directional communications tunnel between the MAG 108A and the LMA 102. This PBU message 110A includes various data values (represented as an 'A' in FIG. 1) based upon the nature of the message to be sent. The PBU message 110A includes a connection identifier (ID) associated with the UE device 130, which here is represented as an 'X1' value. This connection ID may be unique to a particular UE device 130, or may be unique to a particular session of a particular UE device 130. In an embodiment of the invention, the connection ID comprises a Mobile Node Network Access Identifier (MN-NAI), which represents the identity of the UE device 130 in the PMIPv6 domain. In other embodiments, however, the connection ID may comprise one or more of the MN-NAI, an Access Point Name (APN) ID, and a Bearer ID. In other embodiments of the invention, the connection ID may include other values that uniquely identify a UE device 130, network device, or a communications session.

Circle 1 indicates the point where the local mobility anchor 102 receives the PBU message 110A. The PBU message 110A enters the data plane 106 at a port 112 of a line card 114A. Optionally, the local mobility anchor 102 may include a plurality of such line cards 114A-114N. At this point, the data plane 106 is to determine what to do with the PBU message 110A. In an embodiment, the connection ID ('X1') from the PBU message 110A is identified and used along with a steering table 116 to attempt to determine a host process to receive the PBU message 110A.

In this figure, the steering table 116 is illustrated at two points in time (Time=1 and Time=2) to more clearly describe the workings of this embodiment of the invention. However, in this embodiment there is only one steering table 116 on line card 114A. In other embodiments, more than one steering table 116 may be utilized to, for example, increase performance of the system. Additionally, while the steering table 116 is described and illustrated as a table, in certain embodiments the steering table 116 is another data structure such as a tree, directed acyclic graph, matrix, linked list, hash table, database table, or other data structure. Alternatively, the steering table 116 may be an algorithm such as a hash function or another transformative function. A primary purpose of the steering table 116 is to assist the data plane 106 in determining what host process manages a particular control message. In FIG. 1, the steering table 116 is illustrated as containing a first column (or key column) including connection IDs and a second column including process identifiers. Thus, by looking up a connection ID using the steering table 116, the corresponding process identifier will indicate which process of the plurality of processes executing in the distributed control plane 104 is the host process for the message. However, in an embodiment of the invention, the steering table 116 does not map a connection ID to a literal process identifier; instead, it may produce an intermediate result value (not shown) that can be used to eventually determine the host process. For ease of illustration and understanding, though, these embodiments of the steering table 116 are not depicted.

As indicated by circle 2, when Time=1 the steering table 116 contains two entries, or mappings: a connection ID 'X3' is associated with a host process 'P8', and a connection ID 'X7' is associated with a host process 'P1'. Thus, at Time=1, when the line card 114A identifies the connection ID 'X1' from the received PBU message 110A and uses the steering table 116 to attempt to find a host process, no such host process will be found.

At this point, illustrated by circle 3, according to a configuration of the system, the data plane 106 will identify an arbitrary process in some manner. In one configuration, one or more processes are dedicated to receive all PBU messages that have not been identified by the data plane 106 as being managed by a host process. In this configuration, the data plane 106 simply transmits the PBU message 130 to one or more of these dedicated processes. In other configurations, a process of the plurality of processes is randomly selected to receive the PBU message 130, or a process of the plurality of processes is selected to receive the PBU message 130 according to a round-robin arbitration system designed to spread the distribution of such messages.

In FIG. 1, a process selection technique is employed at circle 3 to determine that PBU message 110A shall be sent to a process 'P2' executing on control card 118A in the distributed control plane 104, and process 'P2' is thus deemed arbitrary process. As process 'P2' receives PBU message 110A, it first determines which process is or shall be the host process for PBU message 110A. In embodiments of the invention, the arbitrary process determines the host process based upon data within the PBU message 110A itself, such as the connection ID 'X1'. In other embodiments, the arbitrary process may determine the host process based upon certain statistics or metrics related to the performance of the distributed control plane 104, such as resource usage (CPU and/or memory) or utilization rates of the processes, processing units, or control cards. In FIG. 1, process 'P2' determines that 'P6' is the host process for PBU message 110A, and causes the PBU message 110A to be transferred to control card 118C for process 'P6' at circle 4.

As the host process for PBU message 110A, process 'P6' will become the host process for all control messages related to the connection ID of the PBU message 110A. Process 'P6' will decide what to do in response to receipt of the PBU message 110A; for example, certain connection or session information may be created or updated within the distributed control plane 104 or within other external servers, and certain control messages such as PBA messages may be sent to the MAG 108A or other MAGs 108B-108N. Process 'P6' will then effect these actions.

At circle 5, process 'P6' transmits a mapping message 150 to one or more of the line cards 114A-114N to indicate that process 'P6' is the host process for control messages including the connection ID 'X1'. In other embodiments of the invention, the mapping message 150 may be sent by another process. For example, when process 'P2' determined that process 'P6' should be the host process, process 'P2' could have sent the mapping message 150 to one or more of the line cards 114A-114N indicating that 'P6' is the host process for connection ID 'X1'.

Responsive to receipt of the mapping message 150 from the distributed control plane 104, each line card of the line cards 114A-114N that received the mapping message 150 will update its steering table (e.g. 116) to indicate this relationship. Thus, at Time=2 for the steering table 116 (see the right-side illustration of the table), a third mapping has been added to indicate that the connection ID 'X1' has a host process of 'P6'.

Next, the MAG 108A will transmit another PBU message 110B to the LMA 102 regarding the UE device 130. This transmission may occur for any of the variety of reasons common in PMIPv6 networks as described above. This PBU message 110B may include a variety of data values, depicted here as 'B', but it also includes the connection ID 'X1' associated with the UE device 130. The variety of data values ('B') in PBU message 110B may or may not be different than the data values in PBU message 110A ('A')—what matters is that this PBU message 110B is a different message than PBU message 110A (i.e. transmitted at a different time, or including different data values, etc.).

This PBU message 110B arrives at the LMA 102 at circle 6 and is received at a port 112 of a line card 114A of the data plane 106. Now, at Time=2, the connection ID ('X1') is identified from the PBU message 110B and used with the steering table 116 at circle 7 to determine that the host process for this message is process 'P6'. Because the data plane 106 knows which process the PBU message 110B needs to be sent to, it directly sends at circle 8 the PBU message 110B to process 'P6' of control card 118C. In this manner, the PBU message 110B does not need to be sent to an arbitrary process in the distributed control plane 104, an arbitrary process does not need to determine a host process, and an arbitrary process does not need to transmit the message to a host process.

Figure 2:
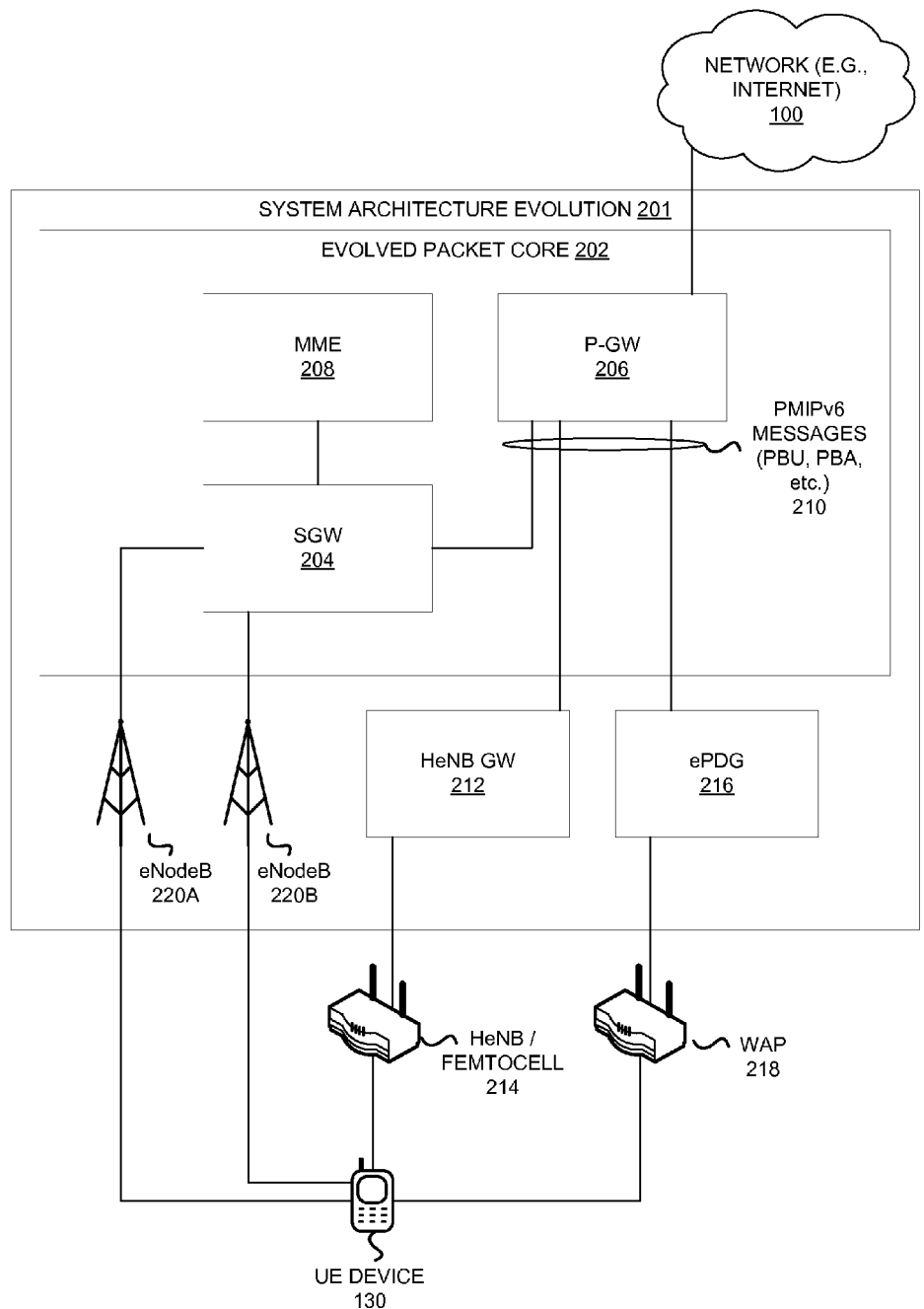
FIG. 2 illustrates a functional overview of a communications network according to one embodiment of the invention.

FIG. 2 illustrates a functional overview of a communications network according to one embodiment of the invention. In this network, a UE device 130 is operable to connect to a network 100 through a variety of access points. The UE device 130 may utilize cellular communications through one or more Evolved Node B (eNodeB) access points 220A and/or 220B. These eNodeB access points 220A and 220B connect to a Serving Gateway (SGW) within an Evolved Packet Core (EPC) 202, which may track the mobility of the UE device 130 using the Mobility Management Entity (MME) 208 and manage the UE device's 130 access to the network 100 through a packet data network gateway (PDN-GW, or P-GW) 206. In this embodiment with a System Architecture Evolution (SAE) 201 core network architecture, the Evolved Packet Core 202 (also known as the SAE core) supports the PMIPv6 protocol and therefore the SGW 204 will serve as a MAG and the P-GW 206 will serve as a LMA, each sending and receiving PMIPv6 control messages 210 to and from each other.

The UE device 130 may also connect through a Home eNodeB (HeNB, or Femtocell) 214, which connects to a HeNB Gateway (HeNB GW) 212. In this case, the HeNB GW 212 serves as a MAG and will transmit and receive PMIPv6 messages 210 to and from the P-GW 206. Additionally, the UE device may connect through a wireless access point (WAP) 218 using a wireless communication protocol such as one of the Institute of Electrical and Electronics Engineers (IEEE) 802.11 standards. In this case, the WAP 218 connects to an Enhanced Packet Data Gateway (ePDG) 218, which serves as a MAG and will transmit and receive PMIPv6 messages 210 to and from the P-GW 206. Other methods of accessing the network are well-known in the art, and only a few such methods are detailed here for ease of understanding.

Figure 3:
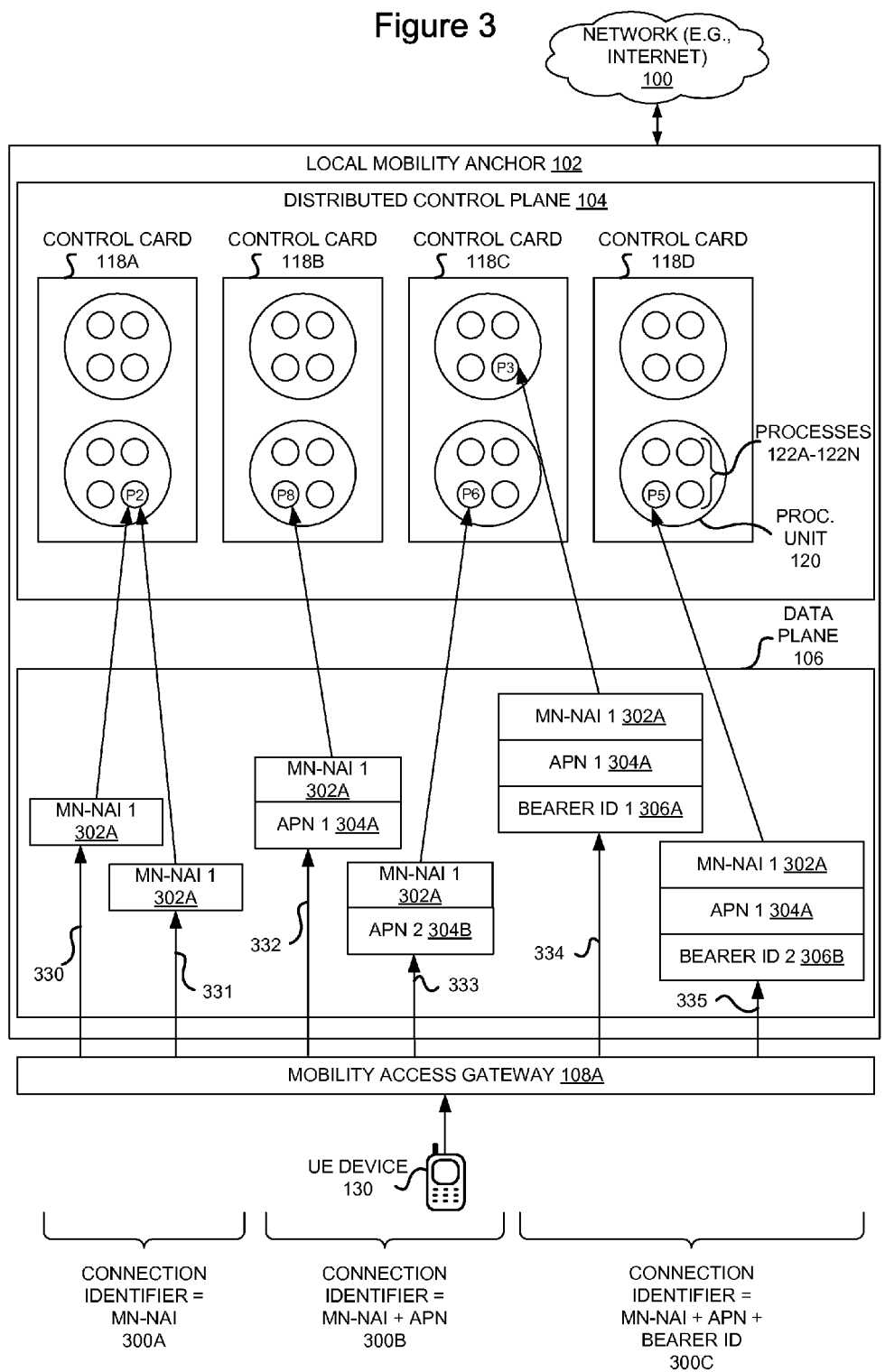
FIG. 3 illustrates a communications network and several possible connection identifier use scenarios according to one embodiment of the invention.

FIG. 3 illustrates a communications network and several possible connection identifier use scenarios according to one embodiment of the invention. As detailed above with reference to FIG. 1, the data plane 106 of the local mobility anchor 102 identifies and utilizes a connection ID from received control messages when determining if it can identify host processes for the messages. Again, the connection IDs may comprise a variety of data values depending upon the needs of each communications system.

At a high level, FIG. 3 illustrates a similar process as detailed in FIG. 1: a UE device 130 connects to a MAG 108A, which transmits PBU messages (e.g. 330-335) to a LMA 102 for the purpose of connecting to a network 100. The LMA 102 receives the PBU messages with a data plane 106, identifies connection IDs in the PBU messages, and uses a data structure or algorithm such as a steering table (not illustrated in FIG. 3) to steer each such PBU message to a host process, if possible. The host processes may be a subset of a plurality of processes (e.g. 122A-122N) executing in the LMA's 104 distributed control plane 104 on one or more processing units (e.g. 120) on one or more control cards 118A-118D. However, FIG. 3 illustrates different steering scenarios with different compositions of connection IDs.

When the system is configured to use only a Mobile Node Network Access Identifier (MN-NAI) of a control message as the connection ID 300A, then a first received control message 330 and a second received control message 331 including the same connection ID 302A will be mapped to a same host process—in this case, it is process 'P2' on control card 118A. This is not an absolute occurrence, though; for example, if the two control messages are received a long time apart as part of two completely different sessions for the same UE device, the messages may be mapped to completely different processes. The example illustrated in FIG. 3 illustrates the common scenario with control messages being transmitted close in time to each other for a common communication session.

When the system is configured to use both a MN-NAI and an Access Point Name (APN) as the connection ID 300B, a first received control message 332 and a second received control message 333 that both include the same MN-NAI 302A are not necessarily mapped to one process. Instead, they may be considered to be two separate PDN connections. This occurs because the first message's 332 connection ID includes an APN 304A that is different than the APN 304B of the second message 333. In one embodiment of the invention illustrated by the example, the first message 332 will be mapped to process 'P8' executing on control card 118B and the second message 333 will be mapped to process 'P6' executing on control card 118C. In this scenario, even though each message included a similar MN-NAI 302A and therefore likely is associated with the same UE device 130, the different APN values (304A, 304B) indicate that the control messages are to be handled differently (e.g. they belong to distinct communication sessions or connections).

When the system is configured to use an MN-NAI, an API, and a Bearer ID (or PDN connection ID) as the connection ID 300C, a first received control message 334 and a second received control message 335 that both include a same MN-NAI 302A and a same APN 304A are not necessarily mapped to one process. Instead, they may be considered to be two separate PDN connections. This occurs because the first message's 334 connection ID includes a Bearer ID 306A that is different than the Bearer ID 306B of the second message 335. Thus, according to an embodiment of the invention, the first message 334 will be mapped to a process 'P3' executing on control card 118C and the second message 335 will be mapped to a process 'P5' executing on control card 118D. In this scenario, even though each message included a similar MN-NAI 302A and also included a similar APN 304A, the differing Bearer ID values (306A, 306B) indicated that the control messages are to be handled differently (e.g. they belong to distinct communication sessions or connections).

Figure 4:
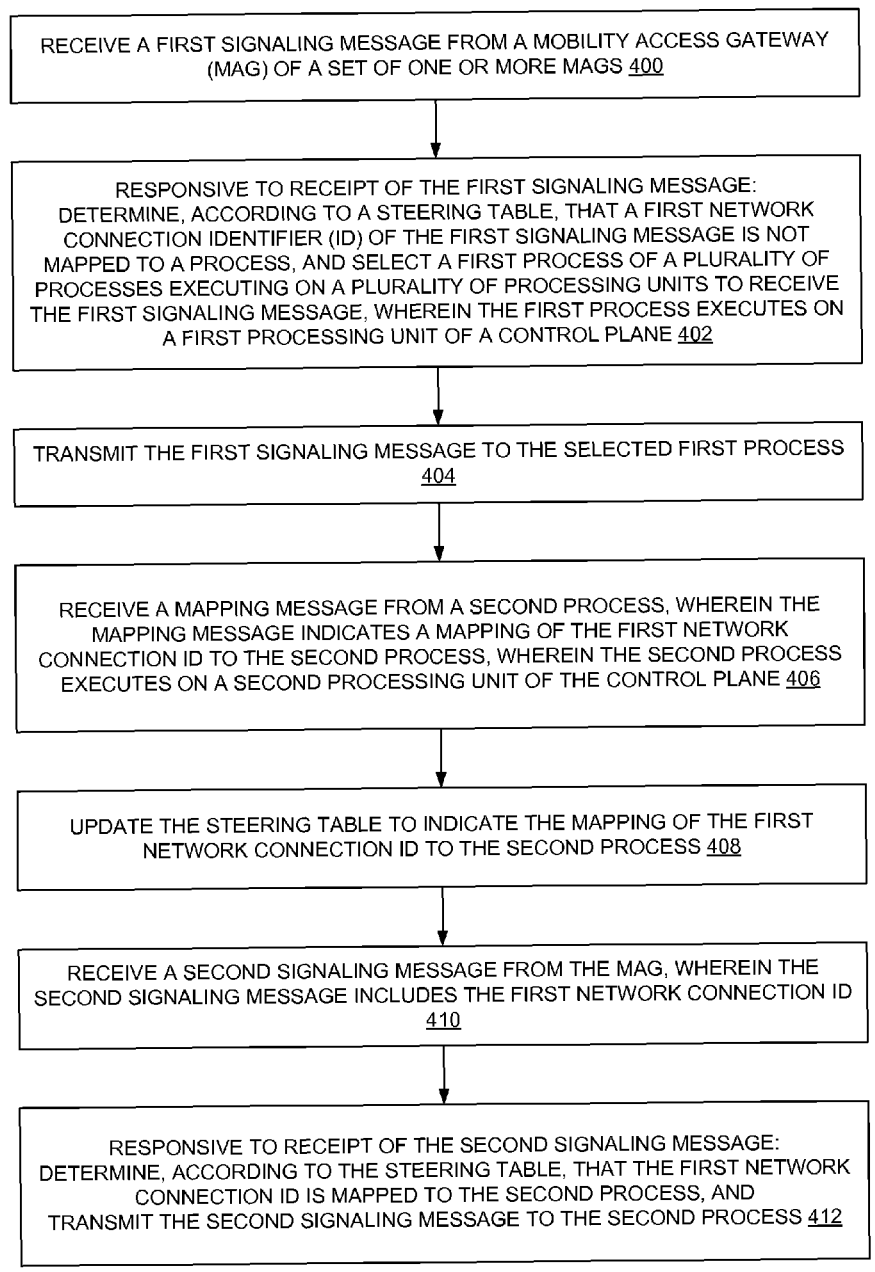
FIG. 4 illustrates a flow diagram of a method in a data plane of a network element acting as a Local Mobility Anchor in a communications network for the efficient distribution of signaling messages according to one embodiment of the invention.

FIG. 4 illustrates a flow diagram of a method in a data plane of a network element acting as a Local Mobility Anchor in a communications network for the efficient distribution of signaling messages according to one embodiment of the invention.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

First, the network element receives a first signaling message from a mobility access gateway (MAG) of a set of one or more MAGs 400. The first signaling message may be a PBU message. Next, responsive to receipt of the first signaling message, the network element is to determine, according to a steering table, that a first network connection ID of the first signaling message is not mapped to a process 402. Also responsive to receipt of the first signaling message, the network element selects a first process of a plurality of processes executing on a plurality of processing units to receive the first signaling message 402. The selected first process executes on a first processing unit of a control plane.

Next, the network element transmits the first signaling message to the selected first process 404. The network element also receives a mapping message from a second process 406. This mapping message indicates a mapping of the first network connection ID to the second process. The second process executes on a second processing unit of the control plane.

The network element updates the steering table to indicate the mapping of the first network connection ID to the second process 408, and also receives a second signaling message from the MAG 410. The second signaling message includes the first network connection ID.

Responsive to receipt of the second signaling message, the network element determines, according to the steering table, that the first network connection ID is mapped to the second process 412. Also, the network element transmits the second signaling message to the second process 412.

Figure 5:
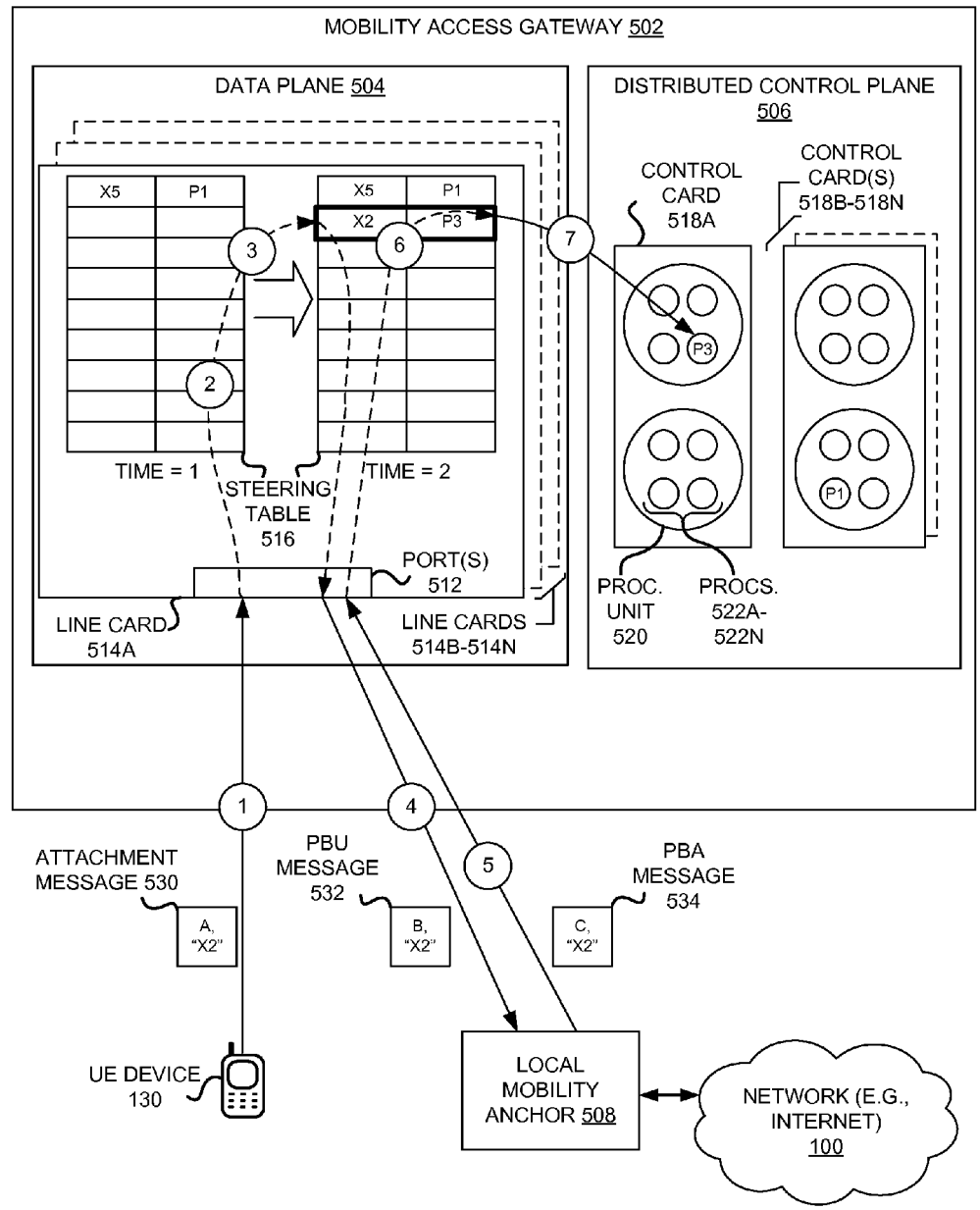
FIG. 5 illustrates a communications network including a Mobility Access Gateway according to one embodiment of the invention.

FIG. 5 illustrates a communications network including a Mobility Access Gateway according to one embodiment of the invention. Previous discussion and examples indicate how a Local Mobility Anchor may efficiently distribute signaling messages received from MAGs. In embodiments of the invention, Mobility Access Gateways may also efficiently distribute signaling messages received from LMAs.

In this embodiment presented in FIG. 5, a user equipment (UE) device 130 (i.e. subscriber end station) is coupled to at least one mobility access gateway 502 (MAG) to gain access to a data network 100 coupled to the LMA 508. In this embodiment the communications network utilizes the PMIPv6 network-based mobility management protocol; however, the invention is also useful in other networks.

In this embodiment, the MAG includes a data plane 504 and a distributed control plane 506. This distributed control plane includes multiple control cards (518A-518N). Each of these control cards is depicted as including two processing units (e.g. 520), which may represent a CPU or a CPU core. Each processing unit is illustrated with multiple processes (e.g. 522A-522N). The quantities and configuration of the distributed control plane 506 are merely illustrative; more or fewer control cards 518A-518N may be used, more or fewer processing units (e.g. 520) may be included per control card, and more or fewer processes (e.g. 522A-522N) may execute. Additionally, while FIG. 5 indicates that the processes (e.g. 522A-522N) appear to be contained on one processing unit (e.g. 520), these processes may not be bound or have affinity to a particular processing unit or control card in certain embodiments.

When the UE device 130 initially attaches to a MAG 502, the MAG 502 will identify the UE device 130 and work to create a session allowing network 100 connectivity for the UE device 130. In performing these tasks, the MAG 502 will send and receive control messages to and from the LMA 508. In this embodiment, because the network is a PMIPv6 network, the control messages comprise Proxy Binding Update (PBU) messages and Proxy Binding Acknowledgement (PBA) messages.

When initially connecting to the network, the UE device 130 becomes attached to the MAG 502 via an attachment message 5305. This attachment message 530 includes various data values (represented as 'A' in FIG. 5) based upon the configuration of the network and UE device 130. The attachment message 530 also includes a connection identifier (ID) associated with the UE device 130. In this figure, the connection ID for attachment message 530 is represented as an 'X2' value. This connection ID may be unique to a particular UE device 130, or may be unique to a particular session of a particular UE device 130. In an embodiment of the invention, the connection ID comprises a Mobile Node Network Access Identifier (MN-NAI), which represents the identity of the UE device 130 in the PMIPv6 domain. In other embodiments, however, the connection ID may comprise one or more of the MN-NAI, an Access Point Name (APN) ID, and a Bearer ID. In other embodiments of the invention, the connection ID may include other values that uniquely identify a UE device 130, network device, or a communications session.

Circle 1 indicates the point where the MAG 502 receives the attachment message 530. The attachment message 530 enters the data plane 504 at a port 512 of a line card 114A. Optionally, the MAG 502 may include a plurality of such line cards 514B-514N. At this point, the data plane 504 is to create a UE session for the UE device 130. This UE session, which is not illustrated here, is used when providing the UE device 130 connectivity to the network 100 through the LMA 508. Initially at Time=1 as indicated at circle 2, the steering table 516 does not have an entry for a UE session for the UE device 130; instead, it only contains an entry for a different UE session for a different UE device. As a session is created by the MAG 502 at circle 3, the UE session is assigned to a host process of the plurality of processes (e.g. 522A-522N) executing on the distributed control plane 506. In this example, the host process is represented by 'P3', so an entry in the steering table 516 at Time=2 is added mapping the connection ID 'X2' from the attachment message 530 to the host process 'P3'.

In this figure, the steering table 516 is illustrated at two points in time (Time=1 and Time=2) to more clearly describe the workings of this embodiment of the invention. However, in this embodiment there is only one steering table 516 on line card 514A. In other embodiments, more than one steering table 516 may be utilized to, for example, increase performance of the system. Additionally, while the steering table 516 is described and illustrated as a table, in certain embodiments the steering table 516 is another data structure such as a tree, directed acyclic graph, matrix, linked list, hash table, database table, or other data structure. Alternatively, the steering table 516 may be an algorithm such as a hash function or another transformative function. A primary purpose of the steering table 516 is to assist the data plane 504 in determining what host process manages a UE session for a particular control message. In FIG. 5, the steering table 516 is illustrated as containing a first column (or key column) including connection IDs and a second column including process identifiers. Thus, by looking up a connection ID using the steering table 516, the corresponding process identifier will indicate which process of the plurality of processes executing in the distributed control plane 506 is the host process for the message. However, in an embodiment of the invention, the steering table 516 does not map a connection ID to a literal process identifier; instead, it may produce an intermediate result value (not shown) that can be used to eventually determine the host process. For ease of illustration and understanding, though, these embodiments of the steering table 516 are not depicted.

With a UE session created for UE device 130, the managing host process 'P3' is identified using the steering table 516 and connection ID 'X2'. In providing the UE device 130 access to the network 100, the MAG 502 transmits a PBU message 532 to the LMA 508 at circle 4. This PBU message 532 includes various data values represented as 'B'. These data fields typically differ depending upon the situation in which the PBU message is sent. However, the PBU message 532 includes the connection ID 'X2' to indicate that the message relates to the session for UE device 130.

At this point, the LMA 508 will transmit a PBA message 534 back to the MAG 502 at circle 5. This PBA message includes various data values hereby represented as 'C', and also includes the connection ID 'X2' to indicate that the message relates to the session for UE device 130. This PBA message 534 is received at port 512 of the line card 514A of the data plane 504 of the MAG 502.

Upon receipt of the PBA message 534 from the LMA 508, the data plane 504 is to transmit the PBA message 534 to a process of the distributed control plane 506 for processing. According to an embodiment of the invention, the data plane 504 utilizes the steering table 516 by identifying the connection ID of the received PBA message 534, which serves to index the steering table 516. At circle 6, because a UE session has been created and a mapping entry of the steering table 516 has already been created to map connection ID 'X2' to process 'P3', the data plane can use the steering table 516 with the identified connection ID 'X2' to determine that the PBA message 534 is to be transmitted to process 'P3'. At circle 7, the data plane 504 may then directly transmit to the PBA message 534 to the host process 'P3' executing on control card 518A.

Figure 6:
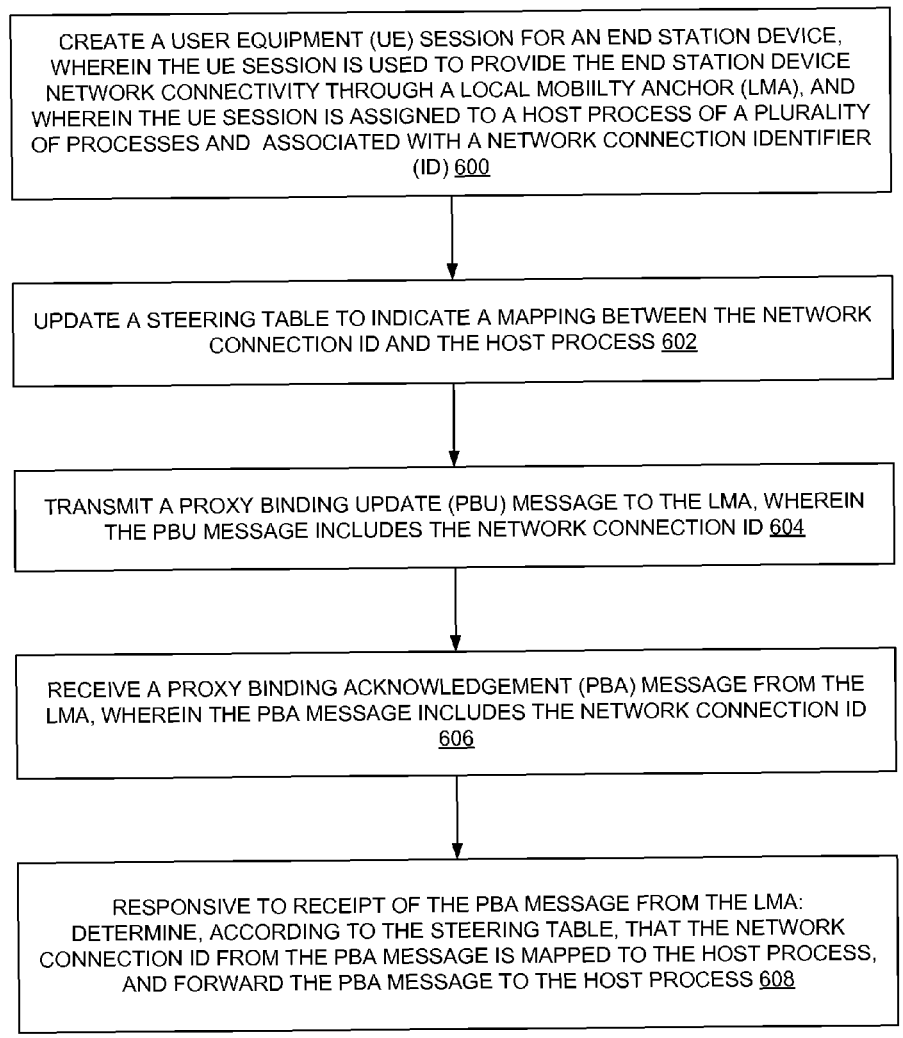
FIG. 6 illustrates a flow diagram of a method in a network element acting as a Mobility Access Gateway in a communications network for the efficient distribution of signaling messages according to one embodiment of the invention.

FIG. 6 illustrates a flow diagram of a method in a network element acting as a Mobility Access Gateway in a communications network for the efficient distribution of signaling messages according to one embodiment of the invention. In this embodiment, the network element has a data plane configured to transmit and receive signaling messages to and from a local mobility anchor (LMA). Each signaling message includes a network connection identifier (ID) associated with an end station device. The network element also includes a control plane having a plurality of processes executing on a plurality of processing units.

First, the MAG creates a User Equipment (UE) session for an end station device (i.e. UE device, mobile node, etc.) 600. The UE session is used to provide the end station device network connectivity through the LMA. The UE session also is assigned to a host process of the plurality of processes and associated with a network connection ID.

Next, the MAG updates a steering table to indicate a mapping between the network connection ID and the host process 602, and transmits a Proxy Binding Update (PBU) message to the LMA 604. The PBU message includes the network connection ID.

Next, the MAG receives a Proxy Binding Acknowledgement (PBA) message from the LMA 606. This PBA message includes the network connection ID. Responsive to receiving the PBA message, the MAG determines, according to the steering table, that the network connection ID from the PBA message is mapped to the host process 608. The MAG also forwards the PBA message to the host process.

While embodiments of the invention has been described in relation to certain network elements operating in Proxy Mobile IPv6 (PMIPv6) networks, other network configurations utilizing different protocols and network elements will similarly benefit from the invention. Therefore, embodiments of the invention are not limited to PMIPv6 networks, local mobility anchor network elements, and mobility access gateway network elements.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a data plane of a network element acting as a local mobility anchor (LMA) in a communications network for the efficient distribution of signaling messages, the data plane configured to receive signaling messages from a set of one or more mobility access gateways (MAGs), each signaling message including a network connection identifier (ID) associated with an end station device, the network element further including a control plane having a plurality of processes executing on a plurality of processing units, the method comprising:
   receiving a first signaling message from a MAG of the set of MAGs;
   responsive to receipt of the first signaling message:
      determining, according to a steering table, that a first network connection ID of the first signaling message is not mapped to a process, and
      selecting a first process of the plurality of processes to receive the first signaling message, wherein the first process executes on a first processing unit of the control plane;
   transmitting the first signaling message to the selected first process;
   receiving a mapping message from the control plane, wherein the mapping message indicates a mapping of the first network connection ID to a second process, wherein the second process executes on a second processing unit of the control plane;
   updating the steering table to indicate the mapping of the first network connection ID to the second process;
   receiving a second signaling message from the MAG, wherein the second signaling message includes the first network connection ID; and
   responsive to receipt of the second signaling message:
      determining, according to the steering table, that the first network connection ID is mapped to the second process, and
      transmitting the second signaling message to the second process.

2. The method of claim 1, wherein each signaling message is a Proxy Mobile IPv6 (PMIPv6) Proxy Binding Update (PBU) message.

3. The method of claim 1, wherein the selecting of the first process of the plurality of processes to receive the first signaling message comprises one of:
   randomly selecting one of a plurality of processes; and
   selecting one of the plurality of processes according to a round robin arbitration algorithm.

4. The method of claim 1, wherein each of the network connection IDs comprises a mobile node network access ID (MN-NAI).

5. The method of claim 4, wherein each of the network connection IDs further comprises a secondary ID, the secondary ID including one or more of an access point name (APN) ID and a bearer ID.

6. The method of claim 5, wherein each secondary ID includes both the APN ID and the bearer ID.

7. The method of claim 5, further comprising:
   receiving a third signaling message from the MAG, wherein the third signaling message includes a second network connection ID, the second network connection ID comprising:
      an MN-NAI that is the same as an MN-NAI of the first network connection ID, and
      a secondary ID that is different than a secondary ID of the first network connection ID; and
   responsive to receipt of the third signaling message:
      determining, according to the steering table, that the second network connection ID is mapped to a third process of the plurality of processes, and
      transmitting the third signaling message to the third process.

8. The method of claim 7, wherein the third process executes on a third processing unit of the control plane.

9. A network element, which is to be coupled between a set of one or more mobility access gateways (MAGs) and a data network, to serve as a local mobility anchor (LMA) and efficiently distribute signaling messages, the network element comprising:
   a set of one or more line cards configured to communicate with the set of MAGs and a set of one or more control cards configured to execute a plurality of processes on a plurality of processing units, the set of line cards configured to:
      receive signaling messages from the set of MAGs, each signaling message including a network connection identifier (ID) associated with an end user device,
      transmit the signaling messages to the plurality of processes, wherein the processes are to be selected to receive the signaling messages according to a steering table, wherein the steering table is to map network connection IDs of signaling messages to processes of the plurality of processes,
      receive mapping messages from some of the plurality of processes, wherein each mapping message is to indicate a mapping of a network connection ID of a signaling message to a process, and
      update the steering table to indicate the mappings of network connection IDs to processes according to the received mapping messages; and
   the set of one or more control cards configured to execute the plurality of processes, each of the plurality of processes configured to:
      receive signaling messages from at least one of the set of line cards, transmit the received signaling messages to different processes of the plurality of processes when the different processes are configured to process the signaling messages, and transmit mapping messages to at least one of the set of line cards to indicate mappings between network connection IDs of the received signaling messages and that process when that process first establishes a session for the network connection IDs.

10. The network element of claim 9, wherein each signaling message is a Proxy Mobile IPv6 (PMIPv6) Proxy Binding Update (PBU) message.

11. The network element of claim 9, wherein the data plane is configured to select the process to receive the signaling message according to the steering table by:

when the network connection ID of the signaling message is mapped to the process in the steering table, selecting the process; and when the network connection ID of the signaling messages is not mapped to the process in the steering table, selecting the process according to one of:

randomly selecting one of the plurality of processes, and selecting one of the plurality of processes according to a round robin arbitration algorithm.

12. The network element of claim 9, wherein each of the network connection IDs comprises a mobile node network access ID (MN-NAI).

13. The network element of claim 12, wherein each of the network connection IDs further comprises a secondary ID, the secondary ID comprising an access point name (APN) ID.

14. The network element of claim 13, wherein the secondary ID further comprises a bearer ID.

15. A method in a network element acting as a mobility access gateway (MAG) in a communications network to efficiently distribute signaling messages, the network element having a data plane configured to transmit and receive signaling messages to and from a local mobility anchor (LMA), each signaling message including a network connection identifier (ID) associated with an end station device, the network element further including a control plane having a plurality of processes executing on a plurality of processing units, the method comprising:

creating a user equipment (UE) session for an end station device, wherein the UE session is used to provide the end station device network connectivity through the LMA, and wherein the UE session is assigned to a host process of the plurality of process and associated with a network connection ID;

updating a steering table to indicate a mapping between the network connection ID and the host process;

transmitting a Proxy Binding Update (PBU) message to the LMA, wherein the PBU message includes the network connection ID;

receiving a Proxy Binding Acknowledgement (PBA) message from the LMA, wherein the PBA message includes the network connection ID; and responsive to receipt of the PBA message from the LMA:

determining, according to the steering table, that the network connection ID from the PBA message is mapped to the host process, and forwarding the PBA message to the host process.

16. The method of claim 15, wherein the network connection ID comprises a mobile node network access ID (MN-NAI).

17. The method of claim 16, wherein the network connection ID further comprises a secondary ID, the secondary ID including one or more of an access point name (APN) ID and a bearer ID.

18. A network element, which is to be coupled between a local mobility anchor (LMA) and an end station device, to serve as a mobility access gateway (MAG) and efficiently distribute signaling messages, the network element comprising:

a set of one or more line cards configured to communicate with the LMA, the end station device, and a set of one or more control cards configured to execute a plurality of processes on a plurality of processing units, the set of line cards configured to:

create user equipment (UE) sessions for end station devices, wherein each UE session is to be assigned to a host process of the plurality of processes and associated with a network connection identifier (ID), and wherein the UE sessions are used to provide the end station devices network connectivity through the LMA, update a steering table to indicate a mapping between network connection IDs and host processes, transmit Proxy Binding Update (PBU) messages to the LMA, wherein each of the PBU messages includes a network connection ID, receive Proxy Binding Acknowledgement (PBA) messages from the LMA, wherein the PBA messages each include a network connection ID, and responsive to receipt of a PBA message from the LMA:

determine, according to the steering table, that the network connection ID included in that PBA message is mapped to a host process, and forward that PBA message to that host process; and the set of one or more control cards configured to execute the plurality of processes, each of the plurality of processes configured to receive PBA messages from at least one of the set of line cards.

19. The network element of claim 18, wherein:

the set of line cards includes at least two line cards, and each line card of the set of line cards includes a plurality of processing units.

20. The network element of claim 19, wherein the network connection ID comprises a mobile node network access ID (MN-NAI).

* * * * *